United States Patent [19]

Hilton

[11] Patent Number: 5,591,924
[45] Date of Patent: Jan. 7, 1997

[54] FORCE AND TORQUE CONVERTER

[75] Inventor: John A. Hilton, Hudson, N.H.

[73] Assignee: Spacetec IMC Corporation, Lowell, Mass.

[21] Appl. No.: 52,377

[22] Filed: Apr. 23, 1993

Related U.S. Application Data

[63] Continuation-in-part of PCT/US92/06961 Aug. 21, 1992, continuation-in-part of Ser. No. 427,931, Oct. 25, 1989, Pat. No. 5,222,400, which is a continuation of Ser. No. 311,113, Feb. 15, 1989, abandoned, which is a continuation of Ser. No. 927,915, Nov. 6, 1986, Pat. No. 4,811,608.

[51] Int. Cl.$^6$ .................................................. G01L 3/00
[52] U.S. Cl. ........................... 73/862.043; 73/862.05; 74/471 XY
[58] Field of Search ................. 73/862.042, 862.043, 73/862.05, 862.041; 74/471 XY; 250/221

[56] References Cited

U.S. PATENT DOCUMENTS

| | | | |
|---|---|---|---|
| 3,561,263 | 2/1971 | Ward et al. | 73/862.043 |
| 3,628,394 | 12/1971 | Keatinge et al. | 74/471 XY |
| 3,640,130 | 2/1972 | Spescha et al. | 73/862.043 |
| 3,693,425 | 9/1972 | Starita et al. | 73/862.043 |
| 3,921,445 | 11/1975 | Hill et al. | 73/862.043 |
| 4,178,799 | 12/1979 | Schmieder et al. | 73/862.045 |
| 4,488,441 | 12/1984 | Ramming | 73/862.044 |
| 4,573,362 | 3/1986 | Amlani | 73/862.045 |
| 4,589,810 | 5/1986 | Heindl et al. | 414/5 |
| 4,607,159 | 8/1986 | Goodson et al. | 74/471 XY |
| 4,680,465 | 7/1987 | Stevens et al. | 250/221 X |
| 4,782,327 | 11/1988 | Kley et al. | 250/221 X |
| 4,950,116 | 8/1990 | Nishida | 901/8 |

FOREIGN PATENT DOCUMENTS

| | | |
|---|---|---|
| 0176173 | 4/1986 | European Pat. Off. . |
| 0227432 | 7/1987 | European Pat. Off. . |
| 211137 | 7/1974 | France . |
| 2211137 | 7/1974 | France . |
| 957980 | 2/1957 | Germany . |
| 2926213 | 6/1979 | Germany . |
| 209519 | 9/1982 | Germany . |
| 3420884 | 6/1984 | Germany . |
| 218458 | 2/1985 | Germany . |
| 224930 | 7/1985 | Germany . |
| 3835955A1 | 5/1989 | Germany . |
| 3835955 | 5/1989 | Germany . |
| 95331 | 5/1985 | Japan . |
| 62-233822 | 10/1987 | Japan . |
| 974155 | 5/1981 | U.S.S.R. . |
| 2096777 | 10/1982 | United Kingdom . |
| 2115935 | 9/1983 | United Kingdom . |

OTHER PUBLICATIONS

A. E. Brenneman, Jr., et al., Robot Position and Orientation Sensor, Feb. 1984, pp. 4457–4462, vol. 26, No. 9 IBM Technical Disclosure Bulletin.
International Search Report Dated Oct. 27, 1994 citing U.S. Pat. No. 4,607,159 [Goodson et al.]
A. E. Brennemann, Jr., R. L. Hollis, Jr. and R. H. Taylor "Robot Position and Orientation Sensor," vol. 26, No. 9 pp. 4457–4462, Feb. 1984, IBM Technical Disclosure Bulletin.

Primary Examiner—Richard Chilcot
Assistant Examiner—Elizabeth L. Dougherty
Attorney, Agent, or Firm—Wolf, Greenfield & Sacks, P.C.

[57] ABSTRACT

A force and torque converter is provided which provides an electronic representation of a planarly applied force and a torque applied about an axis that is orthogonal to the plane. The converter includes a base, an actuating member which is relatively displaced in response to the applied torque and force, resilient mechanisms to provide a restoring force and torque to the actuating member, and sensing mechanisms to sense the applied torque and force and generate an electronic representation thereof. The electronic representation is characterized by a sensitivity curve in which relatively small applied forces and torques result in a relatively low scale factor and where for a range of small applied forces and torques the relation of scale factor with respect to applied torque and force has a relatively low derivative. Further, for a range of larger applied forces and torques, the sensitivity curve has a relatively large scale factor and a relatively large derivative. In one embodiment, the sensitivity curve is implemented by a processing mechanism which includes a microprocessor and firmware.

25 Claims, 6 Drawing Sheets

SCALE FACTOR

SENSED INPUT MAGNITUDE

FORCE AND TORQUE CONVERTER

CROSS REFERENCE TO RELATED APPLICATIONS

The present application is a Continuation-in-Part of International Application No. PCT/US92/06961, International Filing Date Aug. 21, 1992, titled "Force and Torque Converter," which itself is a Continuation-in-Part of an Application for Patent filed Oct. 25, 1989, Ser. No. 07/427,931, now U.S. Pat. No. 5,222,400 which is a Continuation of Ser. No. 07/311,113 filed Feb. 15, 1989, now abandoned, which is a Continuation of Ser. No. 06/927,915 filed Nov. 6, 1986, now U.S. Pat. No. 4,811,608 issued Mar. 14, 1989.

FIELD OF THE INVENTION

The present invention relates to a force and torque converter that is useful in a wide field of activities, particularly those in which a manual motion is to be converted into an electronic representation for use as a control signal.

BACKGROUND TO THE INVENTION

There is a need for a sensing system to monitor applied forces and torques. An example of such a sensor system is described in U.S. Pat. No. 3,921,445 to Hill and Sword. In that specification, the manipulator is of a hand-like form comprising a pair of jaws, which are relatively pivotally movable under operation of an electric motor. The manipulator includes a wrist. Sensing means are provided for sensing the magnitude and direction of applied forces and torques. The applied force is decomposed into components corresponding to three mutually orthogonal axes intersecting at the wrist. The sensing means include a series of sensors, extending around the longitudinal axis of the manipulator.

To date, torque and force converters have been largely limited to sophisticated computer applications and have generally been prohibitively expensive for general computer use. In particular, prior art force converters have high manufacturing costs because of the sensing mechanisms and construction requirements that are necessary.

U.S. Pat. No. 4,811,608 issued Mar. 14, 1989, Force and Torque Converter, is hereby incorporated by reference.

Joysticks, track balls, and mice are commonly used to convert a manual motion into an electronic representation to be used by the computer system. Frequently, these devices are employed as pointing instruments to move a cursor or otherwise manipulate a graphical image on the computer screen.

There are two major types of prior art mice: the mechanical mouse, and the optical mouse. Both types are displacement sensing devices. As such, both types have the disadvantage in that they must frequently be lifted and reoriented to allow further movement. For example, the user's range of comfortable motion is often reached before the user is finished "dragging" a graphical object across the screen. Consequently, the user must stop the operation and lift and reorient the mouse, before resuming the desired task. In addition, small work space environments exacerbate this annoying feature, as there is less space in which to displace the mouse.

Besides these ergonomic disadvantages, mechanical mice require regular cleaning and can slip during operation. This results in inconsistent operation. Most optical mice require an optical pad to operate.

Furthermore, computer types, such as lap tops and notebook computers, are gaining increasing acceptance. These computer types have the potential to operate with extremely limited working space requirements, e.g., while a user is seated on an airplane or a train. However, as just discussed, prior art mice do not readily lend themselves to limited working space environments and thus are unamenable to these computer types. This is unfortunate as "mice" are preferred input devices.

Alternative, relatively stationary input devices, such as track balls and joysticks, have been tried. These devices usually sense either the displacement of the apparatus, e.g., joystick, or a velocity component of the device, e.g., track ball. Though these devices do not require large work spaces, they have numerous disadvantages.

To begin with, the software industry has developed software, for the most part, utilizing mouse-functionality as a de facto standard. For example, popular windowing packages exploit mouse-functionality in the well-known "click and drag" feature. In this feature, the user moves the pointer to a desired menu displayed on the screen; the user then depresses a button to display/select the menu; the user, while still depressing the button, then moves the pointer, until the desired menu option is highlighted; the user then releases the button to activate the option.

A mouse implements this in an ergonomically-acceptable fashion. The user needs only one hand to perform the operation of moving the mouse and depressing and releasing the buttons. Moreover, he can use his ergonomically-preferred fingers, i.e., index and middle fingers, to operate the device and, therefore, attain high accuracy yet comfortable movement.

In contrast, the alternative input devices are awkward devices for these type of graphical operations and ergonomically-disadvantageous to use. A track ball and joystick require the user to use two hands, one hand to move the pointer by displacing a joystick or rolling the track ball, and another to activate the buttons. Alternatively, the user can attempt using just one hand to operate the device and activate the buttons, but this requires the user to use ergonomically-disfavored fingers, e.g., the thumb must be used to either roll the ball or operate buttons. To begin with, users prefer to use one hand when performing graphical input operations. In addition, ergonomically-disfavored fingers do not perform precise operations well. Further, joysticks have an inherent difficulty in placing the buttons sufficiently proximate for use.

Similar difficulties are experienced with popular editing packages and other software.

Further, most existing computer input devices are displacement or velocity sensing devices, not force sensing. It is believed that users prefer to have the sensitivity characteristics of the input device (e.g., precision and quickness of pointer movement) change in relation to the applied force and not in relation to displacement. Though it is recognized that some force and torque converters have been used, these are costly and therefore limited to relatively sophisticated systems.

The dynamics of a displacement sensing device depend on many inputs. Two different applied forces can result in the same velocity or displacement of the device depending on these other input variables, such as the weight of a user's hand. Thus, there is no functional relationship between the displacement and the applied force. Consequently, it is extremely difficult, if not impossible, for a displacement sensing device to implement desirable sensitivity characteristics relating the applied force to the output of the apparatus.

Lastly, existing mice, track balls, and joysticks provide limited information to the computer systems. The planar translational movement of the device is usually decomposed into an X component and a Y component (X and Y being orthogonal axes within the sensed plane). Track balls perform an analogous decomposition of the angular movement of the ball. The decomposed information is then used by the computer system to manipulate a pointer or similar graphical object. Consequently, only two basic pieces of information are generally provided, the X component and the Y component, thus offering only two degrees of programming freedom for the applications developer. If the device could sense a rotational component about an axis, in addition to sensing the planar components, a third degree of programming freedom could be offered to applications developers. This additional degree of freedom could then be utilized to add functionality to the applications.

SUMMARY OF THE INVENTION

The shortcomings of the prior art are overcome and other objects are accomplished with a force and torque converter, which is substantially stationary with respect to a mounting surface which may be part of a computer with which the converter is used. Alternatively, the mounting surface may be independent of the computer.

In one embodiment of the invention, the apparatus transforms applied forces and torques into translational components along three mutually orthogonal axes and torque components about these axes. This embodiment includes a body, which receives the applied force and torque. Three connection members are attached to the body and extend away therefrom. Remote connection points on the respective connection members lie along respective, mutually orthogonal reference axes, which extend from a central point of the body. Legs are pivotally connected to the respective connection members at respective connection points through universal joints of limited range and motion. Biasing mechanisms bias the connecting members towards a central position. Sensor mechanisms sense displacement of each connecting member and each connecting leg thereby determining the nature of the applied forces. Rotation of the body about an axis is sensed by sensors mounted by connection members having reference axes orthogonal to the axis about which rotation takes place.

In one embodiment of the invention, a small displacement results from the application of the translational force and torque. However, alternative embodiments may be constructed in which no displacement occurs. For example, an alternative embodiment may include automatic control to input energy to resist displacement. The input of energy would have a corresponding indicative signal of the applied force, which could then be used by a computer or control system.

In another embodiment, signal processing mechanisms are included for processing the signals generated by the respective sensors into output signals that are representative of the applied torque and translational force.

With regard to the micro-computer field, a lower cost embodiment of the above-described invention may be preferred in some cases. To date, mouse-type or joystick-type general computer applications have utilized only planar sensing (i.e., two degrees of freedom, one for each orthogonal axis of the plane). According to some embodiments of the invention, sensing one rotational component is possible, as well. These embodiments provide a third degree of freedom for programming. It is recognized, though, that more sophisticated applications may need and therefore desire the above-described embodiments, which provide up to six degrees of programming freedom (three degrees of freedom from sensing the three orthogonal directional components of the applied force and three more degrees of freedom from sensing the three rotational components possible from applied torques).

Much like the above-described embodiments, the lower cost embodiments sense the force and torque applied to the body. The construction is simpler since only force in one plane and at most one orthogonal torque needs to be detected. This embodiment retains the essential features of providing an electronic representation of the applied torque and force, and substantially restoring the body to a starting position upon releasing the apparatus.

It is believed that users generally prefer to apply different strength forces to a device depending upon the response they desire. Small forces and torques are generally applied when a precise response is desired. For example, the user might slightly tap the mouse to move a pointer one pixel. Stronger forces and torques are generally applied when a faster response is desired. For example, the user might push the device more forcefully to rapidly move a graphical object across the computer screen.

Different embodiments of the present invention implement a desirable sensitivity curve through appropriate design of the resilient means, the sensing mechanisms, the signal processing mechanisms, or through combinations of the above. The sensitivity curve is such that the device provides a precise response for relatively small applied forces and a fast response for relatively large applied forces. In one embodiment, a sensitivity curve relates applied torques to the output. In another embodiment, the sensitivity curve includes a null region, in which the device essentially ignores applied forces and torques falling within the range of forces and torques corresponding to the null region. Thus, slight jiggles by the user, and similar "noise", are ignored.

BRIEF DESCRIPTION OF THE DRAWING

The invention will become more apparent from the following detailed specification and drawing in which.

DETAILED DESCRIPTION OF THE INVENTION

Figure 1:
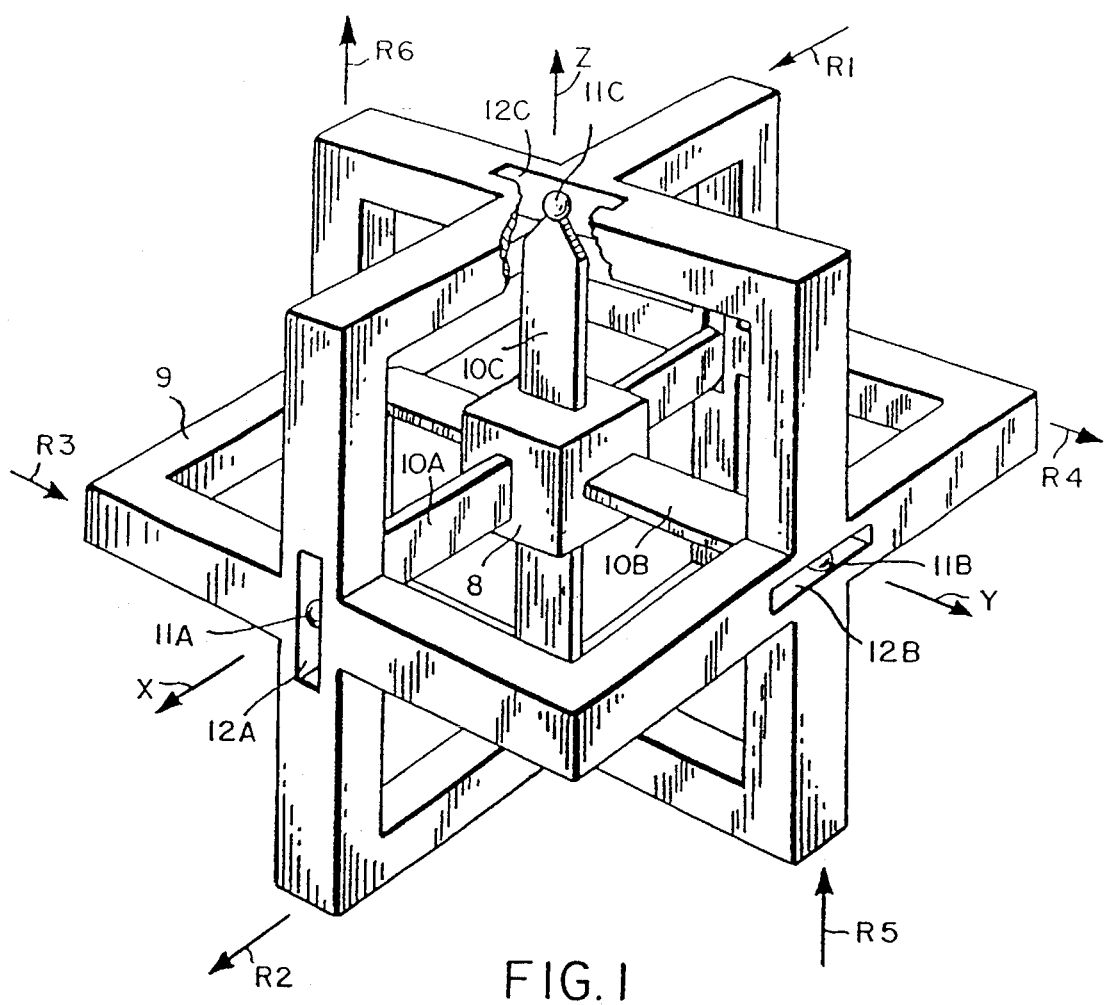
FIG. 1 is a schematic view of a first embodiment of the invention.

Referring to FIG. 1, three pairs of leaf-spring elements 10A, 10B, and 10C are attached to a metal base 8 and extend in three mutually perpendicular planes. The center lines of the leaf-spring elements intersect at the center of the base 8, and extend respectively along X, Y, and Z axes. The leaf-spring elements 10A, 10B, and 10C are substantially of the same length and each leaf-spring element has at the end furthest from the base 8, a ball-like tip 11A, 11B, and 11C which lies within a respective slot 12A, 12B, and 12C in hand grip 9 (represented by a frame for clarity sake). Each slot 12A, 12B, and 12C provides constraint of the corresponding tip 11A, 11B, and 11C against movement relative to the grip 9 in a direction perpendicular to the plane of the corresponding leaf spring.

Thus, for example, a force applied to the grip 9 along the Z axis causes bending of the leaf-springs 10B only. Strain gauges or similar sensing means (not shown) measure the bending or displacement, so that a signal representative of the applied force can be produced. Each tip 11A, 11B, and 11C has a freedom of motion relative to the grip 9 in the plane of the corresponding leaf-spring. Thus, displacement of the hand grip 9 along the direction of elongation of a leaf-spring, or across the direction of the leaf-spring does not result in any bending of the leaf-spring.

A displacement force at an angle is resolved into corresponding couples about the respective X, Y, and Z axes. For example, torque about the Z axis causes equal and opposite bending of the leaf-springs 10A as the respective tips are deflected.

Similarly, a torque applied to the hand grip is resolved into corresponding couples about the respective X, Y, and Z axes. For example, torque about the Z axis causes equal and opposite bending of the leaf-springs 10A as the respective tips are deflected.

By way of illustration, when a force is applied to the hand grip 9 in the X direction, there is a corresponding slight bending of one pair of leaf-spring elements 10C such that one element of the pair bends a distance equal to R1 and the other element bends a distance equal to R2. The resultant force in the X direction is thus given by Fx=R1+R2.

Similarly, if a torque is applied about the Y axis, one of the leaf-springs of a leaf-spring pair 10C bends and produces a displacement of R1, while the other leaf-spring of the same pair bends and produces a displacement of R2 in the opposite direction. The resultant displacement about the Y axis is thus given by $T_y$=R1−R2. The remaining forces and torques are calculated in a similar manner.

Figure 2:
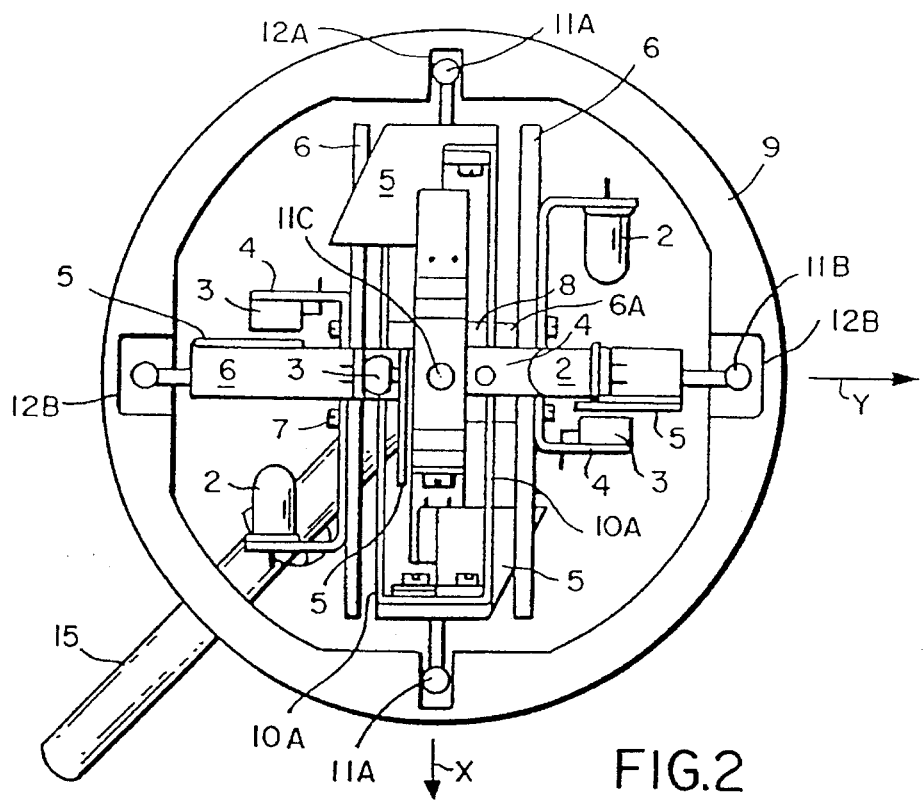
FIG. 2 is a plan view of the first embodiment in practical form with the top of the spherical hand grip removed.
Figure 3:
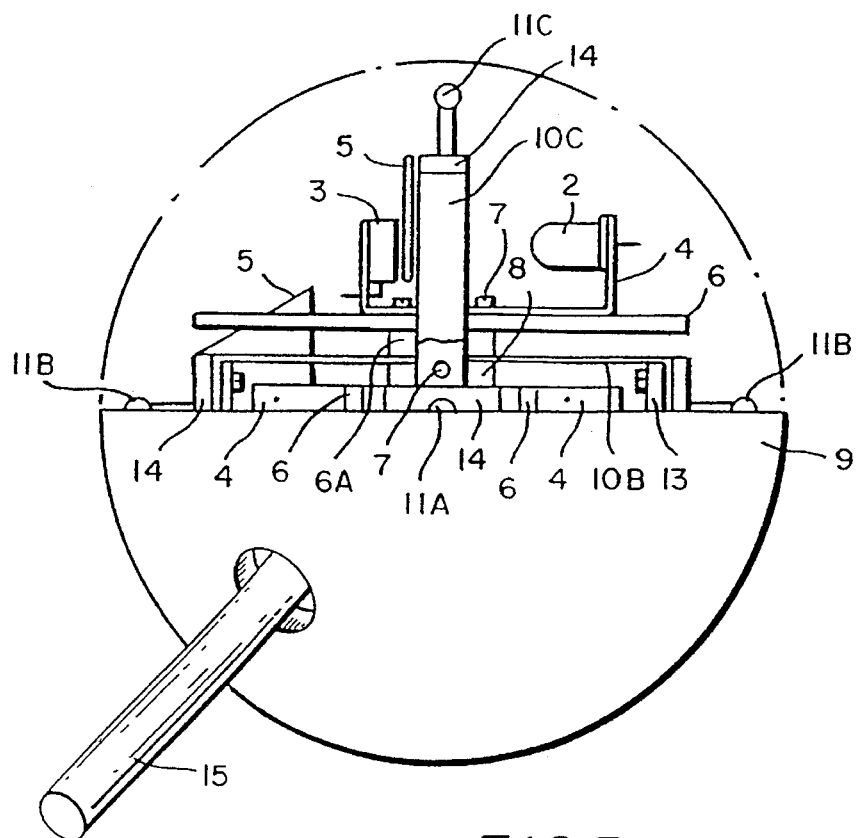
FIG. 3 is a partially broken away side-view of the first embodiment with the top of the hand grip removed and the front portion of the arm structure in the middle region just above the central plane ommited.

In practice an apparatus as shown in FIGS. 2 and 3 is used to implement the principles shown by the schematic diagram of FIG. 1. Like parts have been given like reference numerals. The sensing apparatus is supported by a fixed supporting rod 15 above a ground plane. The rod 15 connects to a central mounting block 8. A force or torque applied by an operator's hand placed on a spherical hand grip 9 is converted into mutually perpendicular components by means of an optical detector. Each of the X, Y, and Z leaf-spring elements consists of a pair of flat resilient metal strips spaced apart and secured by screws 7 to opposite faces of the central mounting block 8. At their remote ends, the strips are interconnected by a connector 13 having screws which also attaches an end fitting 14. The end fitting 14 has an axially extending shaft terminating in the ball like tip 11A, 11B, or 11C.

The optical detector associated with each leaf-spring preferably includes a light emitting diode (LED) 2 and a photodiode 3 fixedly mounted on a bracket 4. Each bracket 4 is mounted on a respective mounting bar 6 secured by screws 7 to the central block 8. A packing block 6A and the central part of the leaf-spring element are sandwiched between the mounting bar 6 and the central block 8. A shutter 5 is attached to the end fitting 14. Thus, movement of the shutter 5 alters the amount of radiation from LED 2 that can be detected by photodiode 3. Thus, the current in the electrical circuitry is representative of the displacement and, consequently, the force.

The Patent entitled TORQUE AND FORCE CONVERTER, U.S. Pat. No. 4,811,608 to Hilton is hereby incorporated by reference to avoid duplicating the disclosure of for the numerous embodiments and their description.

Many applications do not require as many degrees of freedom as the above-described embodiments provide (i.e., six). Consequently, a lower cost embodiment can be achieved by providing fewer degrees of freedom. In one embodiment, only planar forces are sensed, thus providing two degrees of freedom (hereinafter this embodiment is referred to as the "two-axis embodiment"). This embodiment only senses planar forces and decomposes them into X and Y components. In another embodiment, a planar force and a rotational torque applied about an axis that is orthogonal to the plane is sensed, thus providing three degrees of freedom (hereinafter this embodiment is referred to as the "three-axis embodiment").

Figure 4:
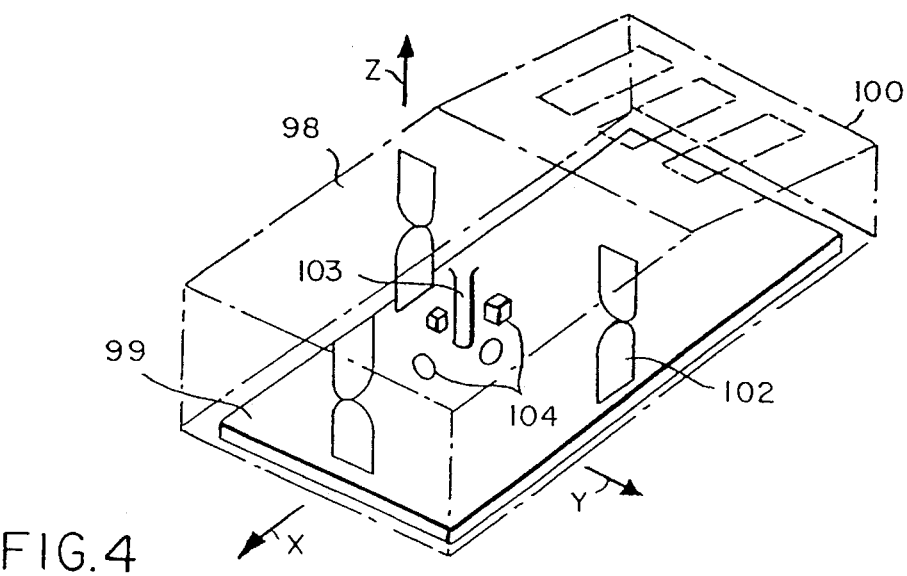
FIG. 4 is a perspective view of an embodiment of the invention that senses planarly applied force.

Referring to FIG. 4, the grip 100 and base 99 are connected by three flat resilient metal flexure elements 102. The metal flexures 102 are mounted with their axes parallel to the Z axis and have a 90° twist about each of their midpoints. A masking post 103 extends from the grip 100 parallel to the Z axis. Sensor sets 104 are positioned to detect movement of masking post 103 (FIG. 4 illustrates one embodiment only, further sensor arrangements are discussed below). In one embodiment, lines 98 transmit an analog signal to an external processing mechanism (discussed below).

Numerous forms of resilient mechanisms, employing various materials in various physical structures, are possible. The resilient mechanisms employed in the above-described embodiments exhibit a set of characteristics important to the operation of the device. These characteristics are isolation of planar effort from non-planar effort, negligible material hysteresis, negligible friction, and high reliability.

The physical hysteresis of the device is determined by the range of physical displacements the device returns to when released. For example, pushing the grip 100 to the limit in one direction and releasing will result in a specific position. Pushing to the limit in another direction and releasing will result in a slightly different position. The difference between these two positions defines the physical hysteresis along the tested direction. The embodiments described above exhibit negligible physical hysteresis due to the use of metal flexure elements. In particular, spring steels have extremely low hysteresis properties. Friction in any form introduces hysteresis into the design, since friction dissipates energy. The flexure arrangement described earlier is designed to avoid friction.

Figure 5:
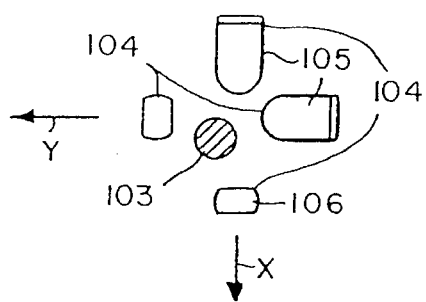
FIG. 5 is a plan view of the sensing mechanism of one embodiment of the invention that sense planarly applied force by photo-optical detection.
Figure 6:
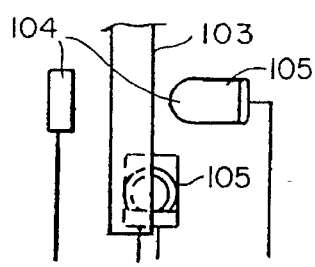
FIG. 6 is a side view of the sensing mechanism of one embodiment of the invention that sense planarly applied force by photo-optical detection.

FIG. 5 is a plan view and FIG. 6 is a side-view of the sensor mechanism of the two-axis embodiment. Sensor sets 104 are located about the masking post 103: one sensor set detects displacement along the X axis; the other sensor set detects displacement along the Y axis. Since the displacement is in direct relation to the applied force and torque, as a result of the resilient mechanisms, the output of the sensors is representative of the applied force and torque.

The orthogonal arrangement shown in FIG. 5 significantly facilitates later processing of the analog signals provided by the sensors. However, the two sensor sets, in fact, need not be orthogonal. For example, if the grip utilizes a design which does not allow such orthogonal arrangement, the sensor sets could be non-orthogonally arranged. All that is required is that the sets be angularly displaced about the center point. Displacement of the masking post could then be decomposed into its orthogonal components during the signal processing phase.

As the grip 100 is displaced, the sensors 104 detect translational displacement along the X and Y axes. Translational displacement along the Z axis and rotational displacement about any axis in the X-Y plane are mostly resisted by the resilient flexure elements 102. Likewise, other inhibiting means, (not shown), may be employed to resist these and other movements to protect the resilient means from unwanted, over-extension. In the two-axis embodiment, rotational displacement about the Z axis is mostly ignored by the sensors, though the resilient means can allow such displacement.

Referring to FIG. 5 the sensor set 104 comprises an infrared light emitting diode (LED) 105, an infrared photodiode 106 and mask 103. As the mask is translationally displaced, the amount of light received by the photodiode 106 corresponds to the displacement of the mask 103 perpendicular to the direction of the light beam. Displacement of the mask parallel to the light beam or rotation of the rod about its axis has negligible affect on the amount of light received by the photodiode 106.

Figure 7:
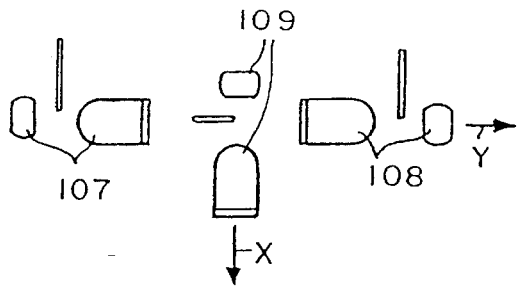
FIG. 7 is a plan view of the sensing mechanism of an embodiment of the invention that senses by photo-optical detection planarly applied force and torque applied about an axis that is orthogonal to the sensed plane.
Figure 8:
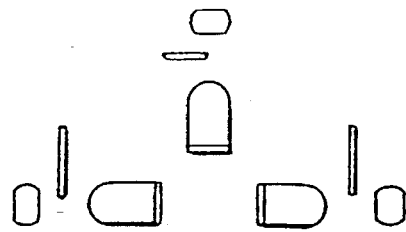
FIG. 8 is a plan view of the sensing mechanism of an alternative embodiment of the invention that senses by photo-optical detection planarly applied force and torque applied about an axis that is orthogonal to the sensed plane.

FIG. 7 is a plan view of the sensor arrangement for a three-axis embodiment. This embodiment can utilize the other elements from the two-axis embodiment, e.g., resilient mechanism. This sensor arrangement detects rotation about the Z axis (the Z axis being perpendicular to the plane of the page). Sensor set 109 detects the translational component along the Y axis. Either of sensor sets 107 and 108 can detect the translational component along the X axis. The combination of sensor sets 107 and 108 detect the rotational component about the Z axis. When the grip is rotated about the Z axis, sensor set 107 will detect a displacement opposite in a direction to the displacement detected by sensor set 108. The sensor sets may be arranged differently, e.g., as shown in FIG. 8, or non-orthogonally as discussed for the two-axis embodiment.

It will be apparent to those skilled in the art that various arrangements may be utilized and that the sensor sets 104 may be substituted with sensors that employ capacitive, inductive, electromagnetic, resistive, piezo-electric or optical sensing. Further, the sensor mechanism may sense the applied force and torque by sensing the resilient mechanisms themselves (e.g., by strain gauges), rather than by sensing components such as masking posts.

The desirable characteristics for sensor sets are non-contact sensing to eliminate friction, the coupling of general planar displacement into responsive and non-responsive displacements, large sensed dynamic range, immunity to external influences, small size, high reliability, and low cost. (Sensed dynamic range is defined as the ratio as the largest sensed displacement to the smallest sensed displacement).

Figure 9:
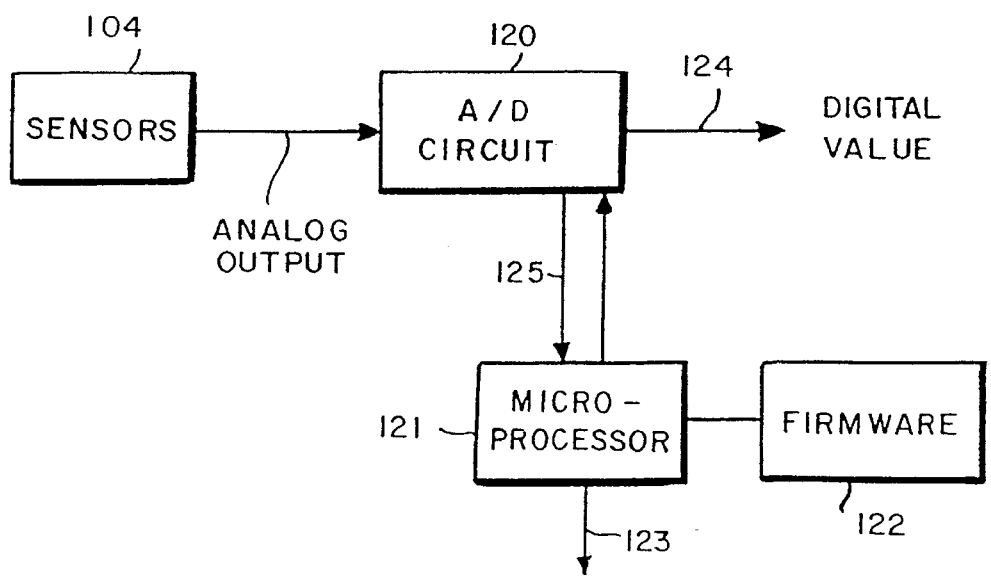
FIG. 9 is a logic-block diagram of an embodiment of the invention.

FIG. 9 is a logic-block diagram of a signal processing mechanism utilized in one embodiment of the invention. Analog output from sensors 104 is converted to a digital value by a dual-slope A/D circuit 120 controlled by a microprocessor 121 and firmware 122. The A/D conversion rate desirably matches or exceeds human response rates for suitable operation. Conversion rates of the order of 100 sets per second are suitable. The dual-slope technique provides a suitable conversion rate at very low cost. It will be apparent to those skilled in the art that other conversion techniques can be employed. In one embodiment of the invention the A/D circuit 120, microprocessor 121 and firmware 122 are placed in the space between grip 100 and base 99 (see FIG. 4). In another embodiment, however, the circuit, microprocessor and firmware is external to the apparatus.

It is desirable to obtain a sensitivity range at least as large as the comfortable operational range of the human hand. The largest detectable effort is determined by the effort required to achieve the largest detectable displacement. The smallest detectable effort is determined by summing the errors due to the hysteresis of the device, the environmental effects on the sensors (temperature, humidity, ageing, etc.) and the accuracy and stability of the sensing electronics while taking account of any compensation made by the control algorithm to minimize any error inducing characteristic.

Most prior art mice sense the velocity of a portion of the apparatus, e.g., a ball, to produce the image displacement. The scale factor for displacement of the image is based upon the magnitude of the velocity. The quality of the "feel" of an input device is dramatically impacted by the sensitivity curve relating the sensed input magnitude to the output. Prior art mice employ a relatively coarse curve, which is typically described by an input/output graph consisting of several "stairs."

In one embodiment of the invention, the sensitivity curve is implemented as a table look up function within the microprocessor 121 and firmware 122. In this fashion, greater flexibility is achieved, permitting a user to customize the operation of the input device to suit their particular taste. Thus, this embodiment receives signals on lines 125 from A/D circuit 120 and creates a representative output transmitted on line 123 (see FIG. 9) with the desirable sensitivity characteristics.

In one embodiment, a null region value and a set of 16 values is stored in a table within the firmware. By using a table whose size is a power of two, such as 16, bits of the binary representation of the applied force and torque, received from the conversion hardware, can index into the table. Linear interpolation is utilized for any received values falling between the 16 values.

The null region value defines the minimum sensed value which will result in a non-zero output. Any input of magnitude less than the null region is automatically zeroed. This prevents such effects as unwanted drifting from occurring due to hysteresis and other errors inherent in the device.

Figure 11:
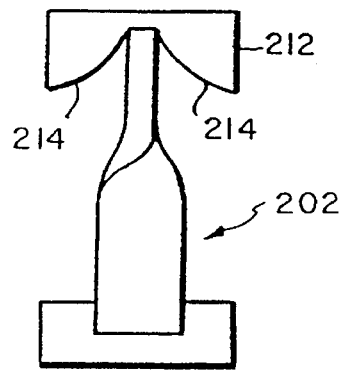
FIG. 11 is a front-view of a resilient mechanism for one embodiment of the invention.
Figure 12:
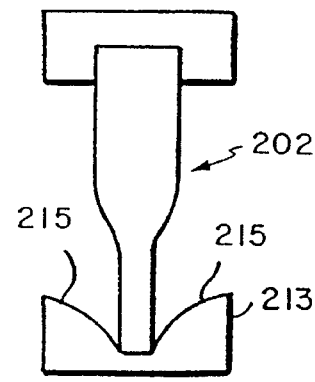
FIG. 12 is a side-view of a resilient mechanism for one embodiment of the invention.

Alternative embodiments of the present invention implement a desirable sensitivity curve in other portions of the hardware. For example, FIG. 11 is a front-view and FIG. 12 is a side-view of a resilient mechanism for one embodiment that attains a desirable sensitivity curve by utilizing resilient mechanisms with a non-linear response curve. The resilient mechanism 202 is constructed to provide higher resilience for weaker applied forces than for stronger ones. Thus, the apparatus provides more precision for smaller applied forces, and faster response for larger applied forces. As seen from the Figures, as the apparatus is displaced the mechanism 202 twists, much like that described for resilient mechanism 102. However, the surfaces 214 and 215 contacting the mechanism 202 effectively change in length, i.e., as the apparatus is displaced more surface contacts the mechanism. Thus the mechanism experiences a non-linear response curve.

Figure 13:
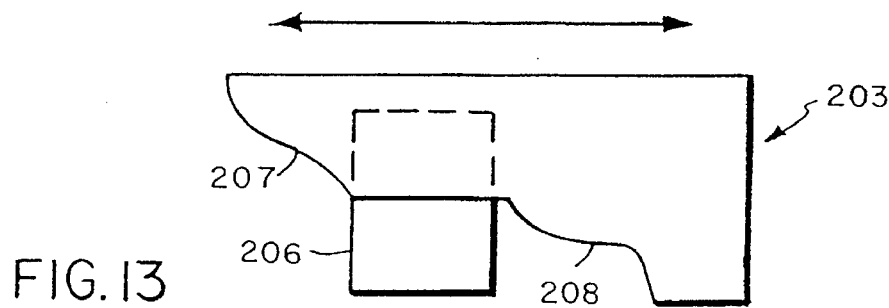
FIG. 13 is a view of a shadow mask for one embodiment of the invention.

In another embodiment, see FIG. 13, the sensing mechanism and corresponding shadow mask implements the desired sensitivity curve. FIG. 13 illustrates a shadow mask that can be used in a three-axis embodiment. Analogous structures can be built for two-axis embodiments. Shadow mask 203 is shown in at rest position. As the shadow mask is displaced in one direction, progressively less radiation is detected by photo-detector 206. As the mask is displaced in the other direction progressively more radiation is masked. Due to the non-linear curves 207 and 208, the amount of radiation detected has a non-linear relationship to the amount of displacement.

Some embodiments of FIGS. 11–12 and 13 transmit a signal to A/D circuit 120, so as to provide a digital representation. The digital representation would retain the same desirable sensitivity characteristics inherent in the analog representation, i.e., microprocessor control would not be needed to create the desirable sensitivity curve. It is recognized, however, that some applications may be capable of directly utilizing the analog signal from sensors 104. Thus, A/D circuit 120, microprocessor 121, and firmware 122 should not be thought of as limitations to the present invention.

Figure 10:
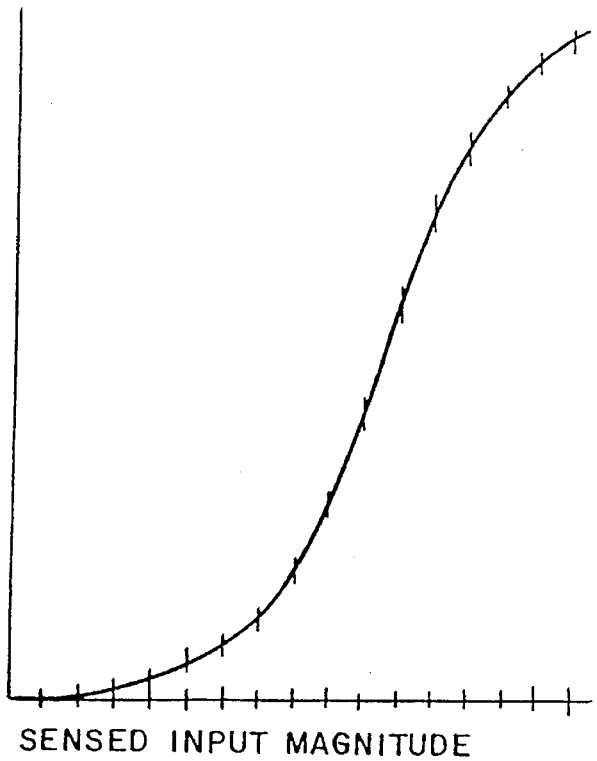
FIG. 10 is a graph of a sensitivity curve relating sensed input magnitude to a scale factor.

FIG. 10 displays a desirable sensitivity curve relating the sensed input magnitude to the scale factor. In one embodiment, the sensed input magnitude is the torque applied to the apparatus; in another embodiment, the sensed input magnitude is the force applied to the apparatus. Image manipulation benefits from a very large control dynamic range. A sensitivity curve of FIG. 10 results in the sense dynamic range being transformed into a much larger control dynamic range than that resulting from velocity control (defined for velocity control as the ratio of the maximum velocity to the minimum velocity) with high resolution at the low end and low resolution at the high end. This type of sensitivity curve results in a significantly improved "feel" of operation compared with linear operation devices.

Figure 14:
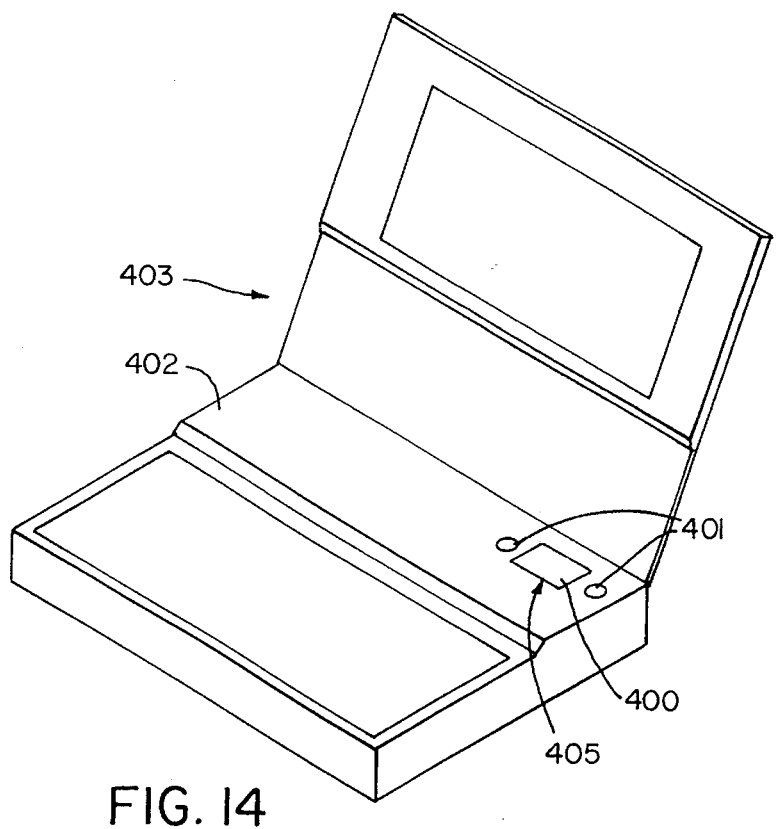
FIG. 14 is a perspective view of a first embodiment of the invention that is integrated with a notebook computer.

FIG. 14 is a perspective view of an embodiment in which a converter of force and/or torque 405 is integrated into a notebook or lap-top computer 403. As will be further described below, the actuating member 400 may be substantially flat or contoured plate, which is flush with, inset into or protrudes from the keyboard housing 402 of the lap-top computer 403. Buttons 401 are illustrated in one suggested placement. It is noted that these buttons may be disposed in numerous alternative placements, including upon the actuating member 400 itself. These buttons provide functionality common to mouse-type input devices.

Figure 15:
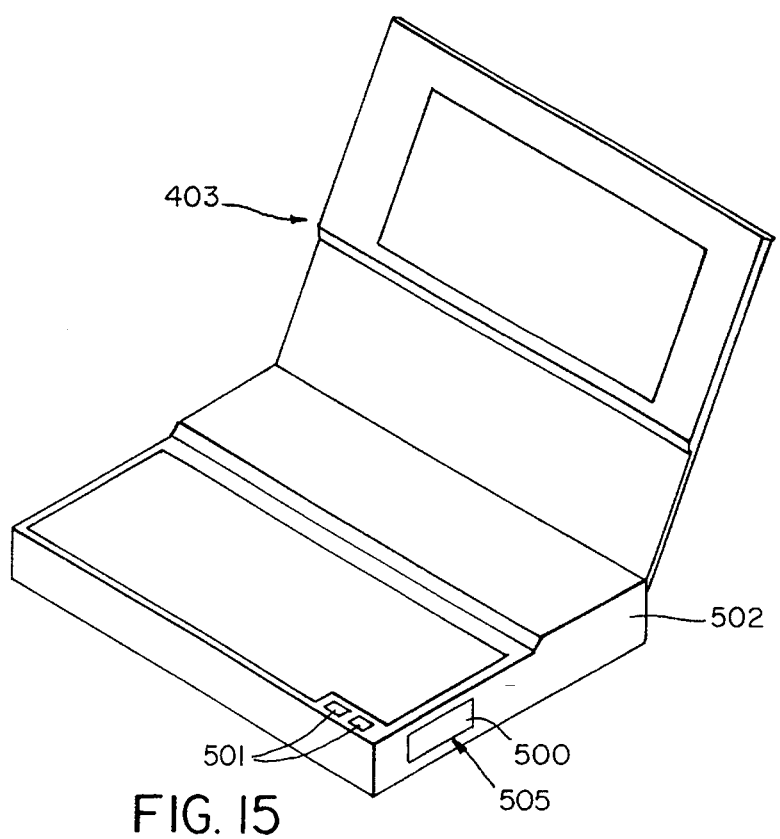
FIG. 15 is a perspective view of a second embodiment that is integrated with a notebook computer.

FIG. 15 is a perspective view of an embodiment in which the converter, now labelled 505, is disposed such that the actuating member 500 is mounted on a side of the keyboard housing of the lap-top computer 403. Like actuating member 400 of FIG. 14, actuating member 500 may be flush with, inset into, or protrude from the housing surface. Buttons 501 are illustrated in one suggested position, and, again, the placement is suggestive only. This arrangement provides certain ergonomic advantages, concerning comfortability for the user's wrist.

Both embodiments are less costly, more reliable, and ergonomically preferrable to track balls and joysticks. In addition, both embodiments are more space efficient and do not necessitate a larger computer package to house the apparatus. Lastly, besides the ergonomic advantages previously discussed, these embodiments are scalable to allow different size and shape actuating members to benefit people with particular needs, such as people, perhaps disabled, that have difficulty using small track balls.

Figure 16:
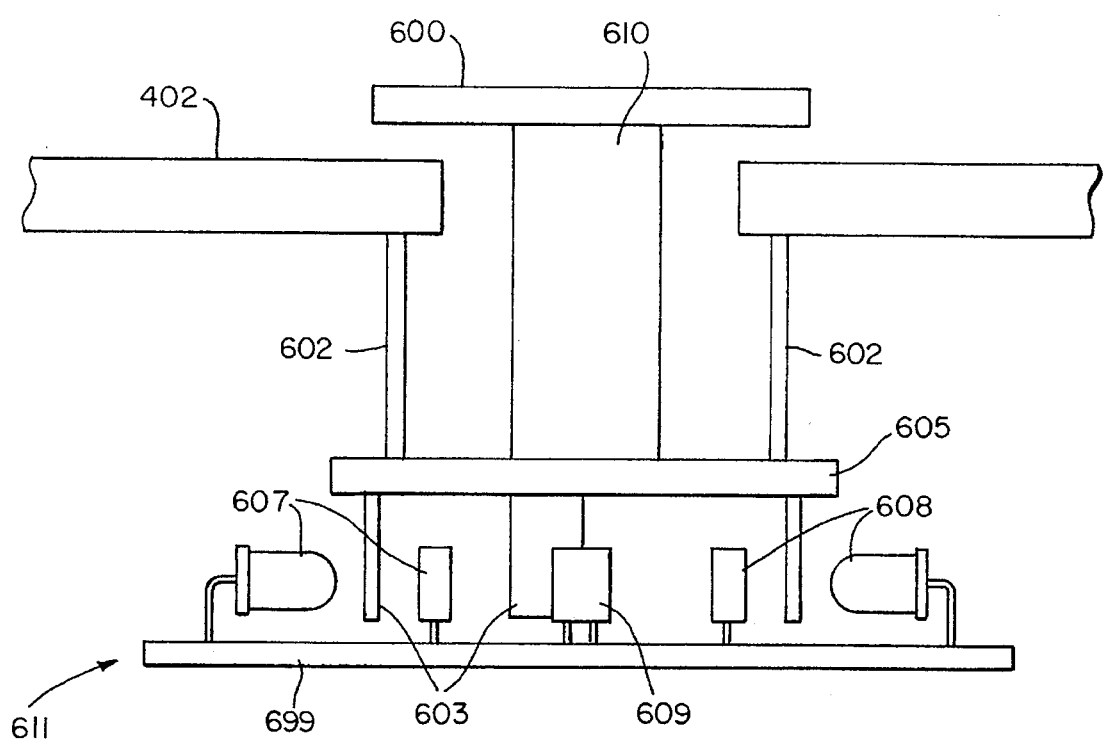
FIG. 16 is a view of the sensing mechanism for the embodiments illustrated in FIG. 14 and FIG. 16.

FIG. 16 is a side view of the converter, as shown in FIG. 14 and FIG. 15. It is noted that the sensing apparatus 611 can employ the alternative embodiments previously described. However, this figure illustrates a three-axis embodiment, as previously discussed and utilizes similar reference numerals to those used in FIG. 7. Those skilled in the art will easily understand how this structure can utilize the two-axis embodiment described with reference to FIG. 5. Grip 600, illustrated as a flat plate, slightly protrudes from the surface of the keyboard housing 402 of the lap-top computer. Connecting member 610 connects grip 600 to mask base 605. Resilient mechanisms 602 connect mask base 605 to the keyboard housing 402 (two resilient mechanisms are hidden in this view). Resilient mechanisms 602 are such that they are highly resilient to vertical displacement. Thus, masks 603, which are connected to mask base 605 do not move vertically. However, resilient mechanisms 602 provide resilience to lateral and rotational displacement, but in a compliant manner. Resilient mechanisms 602 can be metal wire or other structures previously described. Sensor base 699 is fixed to the keyboard structure (connection mechanism not shown). Sensor appararatus 611 operates in an analogous manner to that described for FIG. 7. Namely, sensor 607 and 608 optically detect lateral movement along one axis by detecting the amount of light not masked by corresponding mask 603. Sensor 609 only shows a detector and the emitter is hidden from view. Sensor 609 detects translational movement along an axis orthogonal to the axis sensor 607 detects. The entire sensing apparatus 611, masking apparatus 605 and 603, and the resilient mechanisms 602 are disposed in the interior of the keyboard structure. The connecting member 610 protrudes through an opening of the keyboard structure 402. The resulting structure is extremely space efficient.

Having thus described several particular embodiments of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention.

Accordingly, the foregoing description is by way of example only and is not intended to be limiting. The invention is limited only as defined in the following claims and equivalents thereto.

What is claimed is:

1. An apparatus for providing an electronic representation in response to force being applied to said apparatus, the apparatus comprising:

a base;

an actuating member for receiving said applied force;

resilient means for generally supporting the actuating member from the base, and for providing restoring force to said actuating member; and sensing means responsive to movement of the actuating member relative to said base for providing said electronic representation, the electronic representation being representative of the applied force in a direct relationship which is defined by a sensitivity curve relating the electronic representation to the applied force, said sensitivity curve having a derivative in a first region of the curve that is relatively small compared to a derivative in a second region of the curve and further having a derivative in a third region of the curve that is relatively small compared to said derivative in a second region, said first region corresponding to a range of small applied forces, said second region corresponding to a range of intermediate applied forces, and said third region corresponding to high applied forces.

2. An apparatus as set forth in claim 1, wherein said resilient means provides restoring force to return the actuating member to an original position.

3. An apparatus as set forth in claim 1, wherein the sensitivity curve further includes a null region corresponding to a range of very small applied forces and having a negligible derivative in said null region, and wherein for applied forces within said range of very small applied forces the electronic representation indicates that no force has been applied.

4. An apparatus as set forth in claim 1, wherein the electronic representation is also representative of a torque applied to the apparatus in a direct relationship characterized by a second sensitivity curve relating the electronic representation to the applied torque, said second sensitivity curve having a derivative in a first region of the second curve that is relatively small compared to a derivative in a second region of the second curve and further having a derivative in a third region of the second curve that is relatively small compared to said derivative in a second region of the second curve, said first region of the second curve corresponding to a range of small applied torques, said second region of the second curve corresponding to a range of intermediate applied torques, said third region of the second curve corresponding to high applied torques.

5. An apparatus as set forth in claim 4, wherein the second curve further includes a null region corresponding to a range of very small applied torques and having a negligible derivative in said null region of said second curve, and wherein for applied torques within said range of very small applied torques the electronic representation indicates that no torque has been applied.

6. An apparatus as set forth in claim 1, further comprising inhibiting means for limiting movement of the actuating member to predetermined desirable directions and to predetermined limited extension.

7. An apparatus for providing an electronic representation in response to force being applied in a plane and torque being applied about an axis that is orthogonal to said plane, comprising:

a base;

an actuating member for receiving said applied force and said applied torque, said actuating member being planarly displaced relative to said base in direct relationship to the applied force and being angularly displaced about the axis and relative to said base in direct relationship to the applied torque;

resilient means for generally supporting the actuating member from the base, and for providing restoring force and restoring torque to the actuating member; and sensing means, responsive to movement of said actuating member relative to said base, for providing said electronic representation, the electronic representation being representative of the applied force and the applied torque according to a non-linear sensitivity curve.

8. An apparatus as set forth in claim 7 wherein the sensing means includes a photo-masking means for masking light and a photo-optical sensing means for emitting light and detecting light.

9. An apparatus as set forth in claim 8 wherein photo-optical sensing means is mounted on the base and the photo-masking means depends from the actuating member, the photo-masking means masking light emitted by the photo-optical sensing means in a direct relationship to the planar displacement and the angular displacement of the actuating member.

10. An apparatus as set forth in claim 7, wherein the resilient means provides limited planar displacement with negligible friction and limited angular displacement with negligible friction.

11. An apparatus as set forth in claim 7, wherein said resilient means provides restoring force to return the actuating member to an original position.

12. An apparatus as set forth in claim 7, further comprising inhibiting means for limiting movement of the actuating member to predetermined desirable directions and to predetermined limited extension.

13. An apparatus as set forth in claim 7, wherein the actuating member includes a grip that is constructed and arranged to receive said applied force and said applied torque by a human hand.

14. An apparatus for providing an electronic representation in response to force being applied in a plane and torque being applied about an axis that is orthogonal to said plane, comprising:

a base;

an actuating member for receiving said applied force and said applied torque, said actuating member being planarly displaced relative to said base in direct relationship to the applied force and being angularly displaced about the axis and relative to said base in direct relationship to the applied torque;

resilient means for generally supporting the actuating member from the base, and for providing restoring force and restoring torque to the actuating member; and sensing means responsive to movement of said actuating member relative to said base for providing said electronic representation, the electronic representation being representative of the applied force and the applied torque in a direct relationship, wherein the electronic representation is representative of the applied force in a direct relationship which is defined by a sensitivity curve relating the electronic representation to the applied force, said sensitivity curve having a derivative in a first region of the curve that is relatively small compared to a derivative in a second region of the curve and further having a derivative in a third region of the curve that is relatively small compared to said derivative in said second region, said first region corresponding to a range of small applied forces, said second region corresponding to a range of intermediate applied forces, and said third region corresponding to high applied forces.

15. An apparatus as set forth in claim 14, wherein the sensitivity curve further includes a null region corresponding to a range of very small applied forces and having a negligible derivative, and wherein for applied forces within said range of very small applied forces the electronic representation indicates that no force has been applied.

16. An apparatus as set forth in claim 15, wherein the electronic representation is also representative of the applied torque in a direct relationship characterized by a second sensitivity curve relating the electronic representation to the applied torque, said second sensitivity curve having a derivative in a first region of the second curve that is relatively small compared to a derivative in a second region of the second curve and further having a derivative in a third region of the second curve that is relatively small compared to said derivative in a second region of the second curve, said first region of the second curve corresponding to a range of small applied torques, said second region of the second curve corresponding to a range of intermediate applied torques, said third region of the second curve corresponding to high applied torques.

17. An apparatus as set forth in claim 16, wherein the second curve further includes a null region corresponding to a range of very small applied torques and having a negligible derivative, and wherein for applied torques within said range of very small applied torques the electronic representation indicates that no torque has been applied.

18. An apparatus for providing an electronic representation in response to force being applied in a plane and torque being applied about an axis that is orthogonal to said plane comprising:

a base;

an actuating member for receiving said applied force and said applied torque, said actuating member being planarly displaced relative to said base in direct relationship to the applied force and being angularly displaced about the axis and relative to said base in direct relationship to the applied torque;

resilient means for generally supporting the actuating member from the base, and for providing restoring force and restoring torque to the actuating member;

sensing means responsive to movement of said actuating member relative to said base for providing said electronic representation, the electronic representation being representative of the applied force and the applied torque in a direct relationship; and processing means for receiving said electronic representation and for providing output data wherein said output data is representative of the applied force in a direct relationship which is defined by a sensitivity curve relating the output data to the applied force, said sensitivity curve having a derivative in a first region of the curve that is relatively small compared to a derivative in a second region of the curve and further having a derivative in a third region of the curve that is relatively small compared to said derivative in said second region, said first region corresponding to a range of small applied forces, said second region corresponding to a range of intermediate applied forces, and said third region corresponding to high applied forces.

19. An apparatus as set forth in claim 18, wherein said electronic representation is analog and wherein said output data is digital.

20. An apparatus as set forth in claim 19, wherein said processing means includes an A/D converter for receiving said electronic representation, and providing A/D data utilizing a dual-slope conversion technique.

21. An apparatus as set forth in claim 20, wherein said processing means further includes a microprocessor that receives the A/D data, and provides the output data according to user customized sensitivity characteristics.

22. An apparatus as set forth in claim 18, wherein the sensitivity curve further includes a null region corresponding to a range of very small applied forces and having a negligible derivative, and wherein for applied forces within said range of very small applied forces the output data indicates that no force has been applied.

23. An apparatus as set forth in claim 22, wherein the output data is also representative of the applied torque in a direct relationship characterized by a second sensitivity curve relating the output data to the applied torque, said second sensitivity curve being continuous and having a derivative in a first region of the second curve that is relatively small compared to a derivative in a second region of the second curve and further having a derivative in a third region of the second curve that is relatively small compared to said derivative in a second region of the second curve, said first region of the second curve corresponding to a range of small applied torques, said second region of the second curve corresponding to a range of intermediate applied torques, said third region of the second curve corresponding to high applied torques.

24. An apparatus as set forth in claim 23, wherein the second curve further includes a null region corresponding to a range of very small applied torques and having a negligible derivative, and wherein for applied torques within said range of very small applied torques the output data indicates that no torque has been applied.

25. An apparatus for providing an electronic representation in response to force being applied in a plane and torque being applied about an axis that is orthogonal to said plane, comprising:

a base;

an actuating member for receiving said applied force and said applied torque, said actuating member being planarly displaced relative to said base in direct relationship to the applied force and being angularly displaced about the axis and relative to said base in direct relationship to the applied torque, said actuating member constructed to be responsive only to said planarly applied force and said axially applied torque;

resilient means for generally supporting the actuating member from the base, and for providing restoring force and restoring torque to the actuating member; and sensing means, responsive to movement of said actuating member relative to said base, for providing said electronic representation, the electronic representation being representative of the applied force and the applied torque according to a non-linear sensitivity curve.

* * * * *